United States Patent [19]
Snyder et al.

[11] Patent Number: 6,064,586
[45] Date of Patent: May 16, 2000

[54] METHOD FOR HOLOGRAPHIC DATA STORAGE AND RETRIEVAL

[75] Inventors: Ray Snyder, San Francisco; Andrew Daiber, Palo Alto, both of Calif.

[73] Assignee: Siros Technologies, Inc., San Jose, Calif.

[21] Appl. No.: 09/224,031

[22] Filed: Dec. 31, 1998

[51] Int. Cl.⁷ ................................................. G03H 1/26
[52] U.S. Cl. ........................ 365/125; 365/216; 359/22; 359/24
[58] Field of Search ................... 365/125, 129, 365/216; 359/22, 11, 29, 24

[56] References Cited

U.S. PATENT DOCUMENTS

| | | | |
|---|---|---|---|
| 4,149,269 | 4/1979 | Abe et al. ................................. | 362/215 |
| 5,265,226 | 11/1993 | Ueda ......................................... | 364/574 |
| 5,511,058 | 4/1996 | Visel et al. ............................... | 369/103 |
| 5,519,517 | 5/1996 | Redfield et al. .......................... | 359/22 |
| 5,812,288 | 9/1998 | Curtis et al. .............................. | 359/21 |
| 5,859,808 | 1/1999 | Campbell et al. ........................ | 365/216 |
| 5,877,875 | 3/1999 | Reis et al. ................................. | 365/125 |

FOREIGN PATENT DOCUMENTS

| | | | |
|---|---|---|---|
| 0851319 | 7/1998 | European Pat. Off. ......... | G03H 1/26 |

*Primary Examiner*—Vu A. Le
*Attorney, Agent, or Firm*—Lumen Intellectual Property Services

[57] ABSTRACT

A method for holographic data storage comprises the step of formatting a page with calibration marks as well as data patterns representing data. The page is then stored in a holographic storage medium. A method for holographic data retrieval comprises the step of detecting locations of the calibration marks. A mathematical function is fitted to the locations, and the function is used to compensate for distortion in the detected image of the page. In the preferred embodiment, the calibration marks are also used to generate an inverse point spread function that is used to digitally sharpen the detected image of the page. In the preferred embodiment, the data patterns are dispersed throughout the page by an interleaving algorithm, so that subsequent data patterns are not stored consecutively in the page.

27 Claims, 7 Drawing Sheets

METHOD FOR HOLOGRAPHIC DATA STORAGE AND RETRIEVAL

U.S. GOVERNMENT RIGHTS

This invention was made with U.S. Government support under grant No. MDA972-94-2-0008, awarded by the ARPA-Industry-University Photorefractive Information Storage Materials (PRISM) Consortium. The U.S. Government has certain rights in this invention.

FIELD OF THE INVENTION

The present invention generally relates to holographic data storage, and more specifically to a method for storing and retrieving data in a holographic storage medium.

BACKGROUND

Holography provides a promising technique for storing digital data at high density with rapid access times. In a page-based holographic system, data is stored by passing a monochromatic signal beam through a spatial light modulator having portions of varying degrees of transparency corresponding to digits of information. The signal beam then strikes a holographic storage medium. A reference beam is also incident upon the storage medium and interferes with the signal beam. In the regions of constructive interference between the two beams, the index of refraction of the storage medium is changed; a hologram representing the page of data displayed on the spatial light modulator is thereby stored.

To read the data stored in the medium, the reference beam, but no signal beam, is incident upon the medium. The regions of altered index of refraction cause a portion of the reference beam to diffract and emerge from the storage medium as a reconstructed signal beam, or an image beam. The image beam carries a holographic image of the page of stored data, and is detected by a pixellated detector, such as a CCD camera. An information pattern is thereby projected upon the detector.

Reference marks of various kinds are often stored with the data in the holographic medium to aid in the reading of the data. Redfield et al., in U.S. Pat. No. 5,519,517, provide fiducial marks in the storage medium, and store the data at known positions with respect to the fiducial marks. The marks are then used for aligning the detector with the data. Hays et al., in U.S. Pat. No. 5,777,760, also store fiducial marks that indicate not only the location of the stored data, but also the relative angle between the reference beam and a surface of the storage medium. This angle needs to be determined, for example, when several pages of data are stored in the same volume of storage medium using angle multiplexing techniques.

Abe at al., in U.S. Pat. No. 4,149,269 describe fiducial marks used to identify information in a page, as well as to set the quantization threshold for converting the detected intensities of the image beam to binary data. Richardson, in European Patent Application EP 0 851 319 A1, also describes fiducial marks, or "test signals," for setting the quantization threshold.

One difficulty with holographic data storage is that the detector pixels are often misaligned with the data pixels of the information pattern detected. One method for addressing this problem is given by Visel et al. in U.S. Pat. No. 5,511,058. Visel et al. process the detected signals to compensate for such a misalignment.

Another problem with holographic data retrieval is distortion of the image received by the detector. The optical components that deliver the signal and image beams generally cause some measure of distortion. The prior art does not address this problem.

Another difficulty with holographic storage is that data can be corrupted. Other storage systems, for example magnetic storage systems, suffer from the same problem. To minimize the impact of the data loss in those systems, typically error correction codes are used, and the bits of each code word are dispersed throughout the magnetic medium. If a small enough region of the magnetic medium is damaged, that region would not typically contain any code word in its entirety, but portions of a number of code words. These lost portions can often be recovered using the error correction code. Methods of dispersing data in magnetic media rely on the one-dimensional nature of a magnetic track.

Ueda, in U.S. Pat. No. 5,265,226, gives a more general method for dispersing data throughout a memory device. What is needed, however, is a method specifically designed for the two-dimensional structure of a page of holographic data Curtis et al., in U.S. Pat. No. 5,812,288, describe a method for dispersing data in a page of holographic data, wherein the symbols of a particular code word occupy different rows and columns of the page. However, Curtis et al. do not provide an optimal algorithm for performing this dispersal.

SUMMARY

Briefly and in general terms, the present invention provides an improved holographic data storage and/or retrieval system by providing a method for compensating for distortion in two-dimensional pages of data. The invention also provides an algorithm for dispersing data throughout a two dimensional page of holographic data. The method is robust to defects in the storage medium and to distortions in the data stored.

Data storage is accomplished by formatting a data page. The page comprises page pixels; the page pixels are used to store alignment marks, calibration marks, and data patterns. The data patterns contain information to be stored. The alignment marks and calibration marks are used for diagnostic purposes during the readout of the data. To store the page, the page is displayed on a spatial light modulator and stored in a holographic storage medium using signal and reference beams.

To retrieve the page, the reference beam is incident upon the holographic storage medium; a portion of the reference beam is diffracted, resulting in an image beam. The image beam strikes a detector. An information pattern is thereby projected upon the detector by the image beam. The information pattern comprises data pixels; a plurality of the data pixels correspond to the calibration marks. Using output signals from the detector, the locations of the calibration marks within the information pattern are identified. Since the original locations of the calibration marks within the page are known, a mathematical mapping, or set of functions, is created that correlates coordinates of the page to coordinates of the information pattern.

Using the mathematical mapping, data locations of data pixels corresponding to the page pixels are identified. In the preferred embodiment, the detector comprises detector pixels. In this embodiment, output signals from one or more of the detector pixels in closest proximity to the data locations are used to form a first data array corresponding to the page of stored data.

In the preferred embodiment of the present invention, by way of example and not necessarily by way of limitation, the mathematical mapping is nonlinear; the mapping thereby accounts for distortions to the page that occur during data storage and retrieval. Such distortions are frequently generated by optics used for holographic storage and recall.

In the preferred embodiment, the calibration marks comprise point spread marks. The point spread marks are any known pattern, the detection of which gives information on blurring that has occurred during the storage and retrieval of the page. The blurring is generally caused by limitations and features of the optics used. A point spread function is derived from the detected intensities corresponding to the point spread mark. The point spread function may be inverted and convolved with the first data array to obtain a second data array corresponding to a sharpened image of the information pattern.

The alignment marks stored in the page are used to obtain a coarse position and orientation of the information pattern.

In the preferred embodiment, binary data is converted to the data patterns; the data patterns are subsequently dispersed throughout the page using an interleaving algorithm. A matrix of storage sectors having R rows and C columns is defined within the page. Each storage sector comprises n page pixels, and is the size of one data pattern. The interleaving algorithm typically separates adjacent data patterns by an integral multiple of s columns, where s is a number that is relatively prime to C.

DETAILED DESCRIPTION

I. DATA STORAGE

Page Formatting

Figure 1:
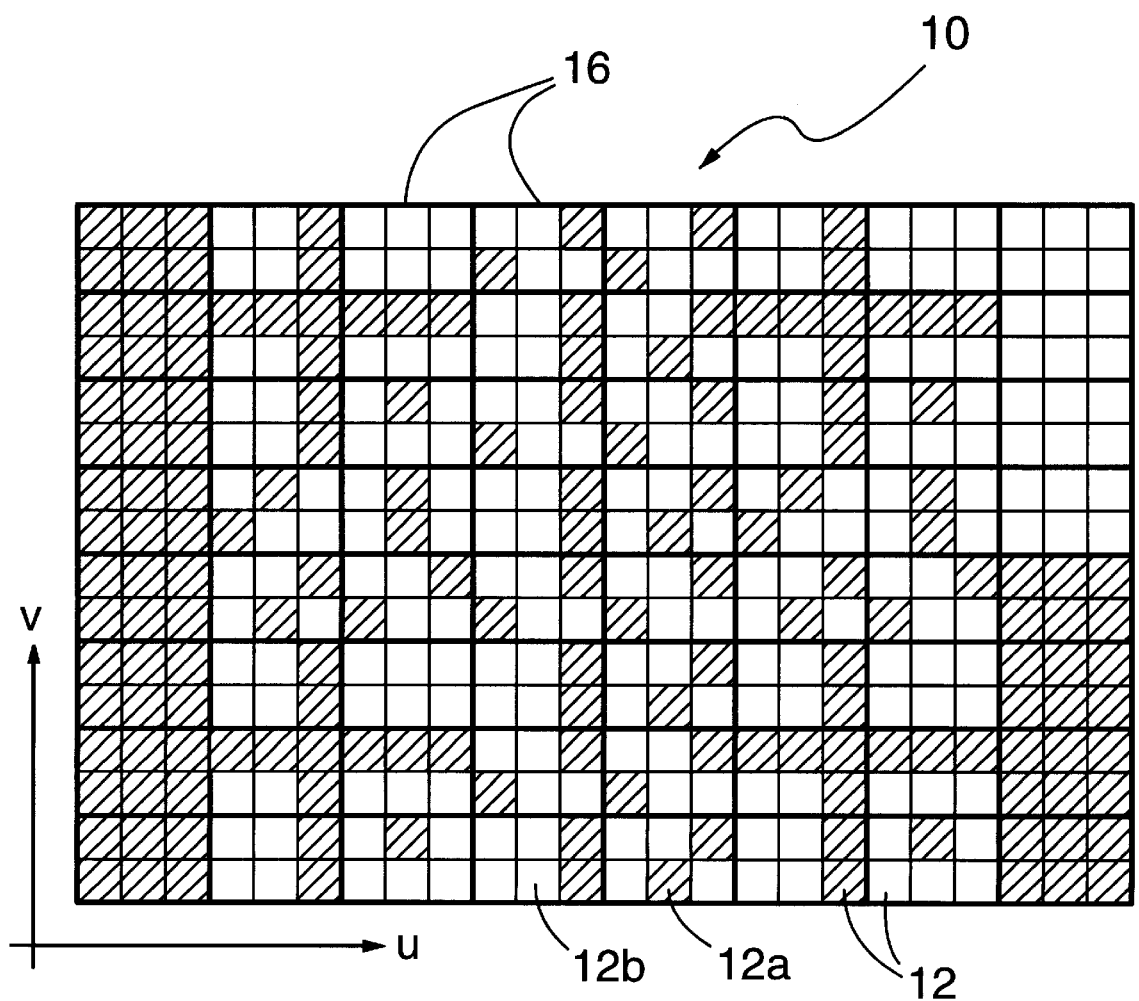
FIG. 1 shows a page to be stored holographically.

A method for storing holographic data is described. As shown in FIG. 1, a page 10 is formatted for storage. Page 10 comprises pages pixels 12. Locations of page pixels 12 are identified by Cartesian coordinates u and v. In the presently preferred embodiment, page 10 is a roughly 500×500 array of page pixels 12; the figures, for the sake of clarity, show a fewer number of page pixels 12.

Figure 6:
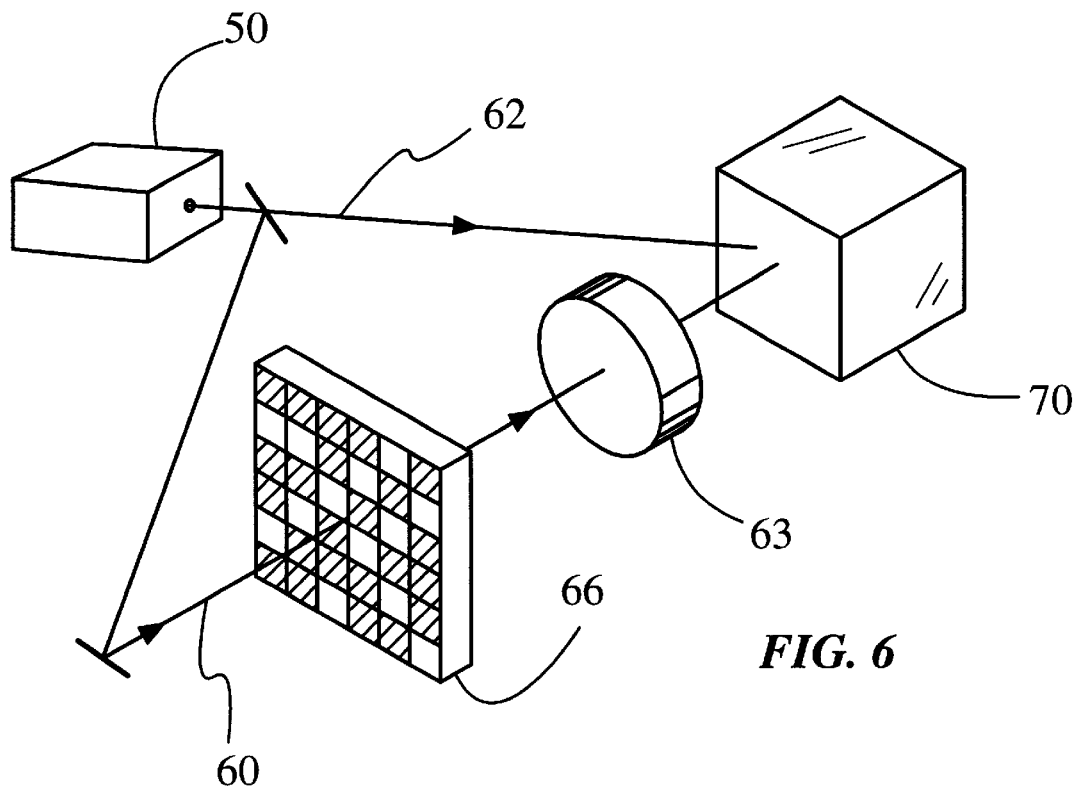
FIG. 6 illustrates a system for holographically storing the page.

Page 10 is displayed on a spatial light modulator 66, as shown in FIG. 6, and stored in a holographic storage medium 70. When displayed on the spatial light modulator, each of the page pixels has a transmittivity representing a digit of information. In some embodiments, for example, the page pixels correspond to gray scale digits, and have an opacity falling within a certain range, for example between 1 and 10. In other embodiments, the page pixels represent binary digits, called "channel bits."

The spatial light modulator 66 of FIG. 6 is a transmissive spatial light modulator; however, in some embodiments, spatial light modulator 66 is a reflective spatial light modulator. In these embodiments, each of the page pixels 12 has a reflectivity corresponding to a digit of information. Below it is assumed that spatial light modulator 66 is transmissive, but it is obvious to a skilled practitioner how to adapt the following description for a reflective spatial light modulator.

FIG. 1 shows an embodiment where each of the page pixels corresponds to a binary digit, or channel bit. Each of the page pixels carries either an "on" channel bit 12a or an "off" channel bit 12b. In the presently preferred embodiment, the "on" channel bits are represented by transparent page pixels, and the "off" channel bits correspond to opaque page pixels.

Figure 2:
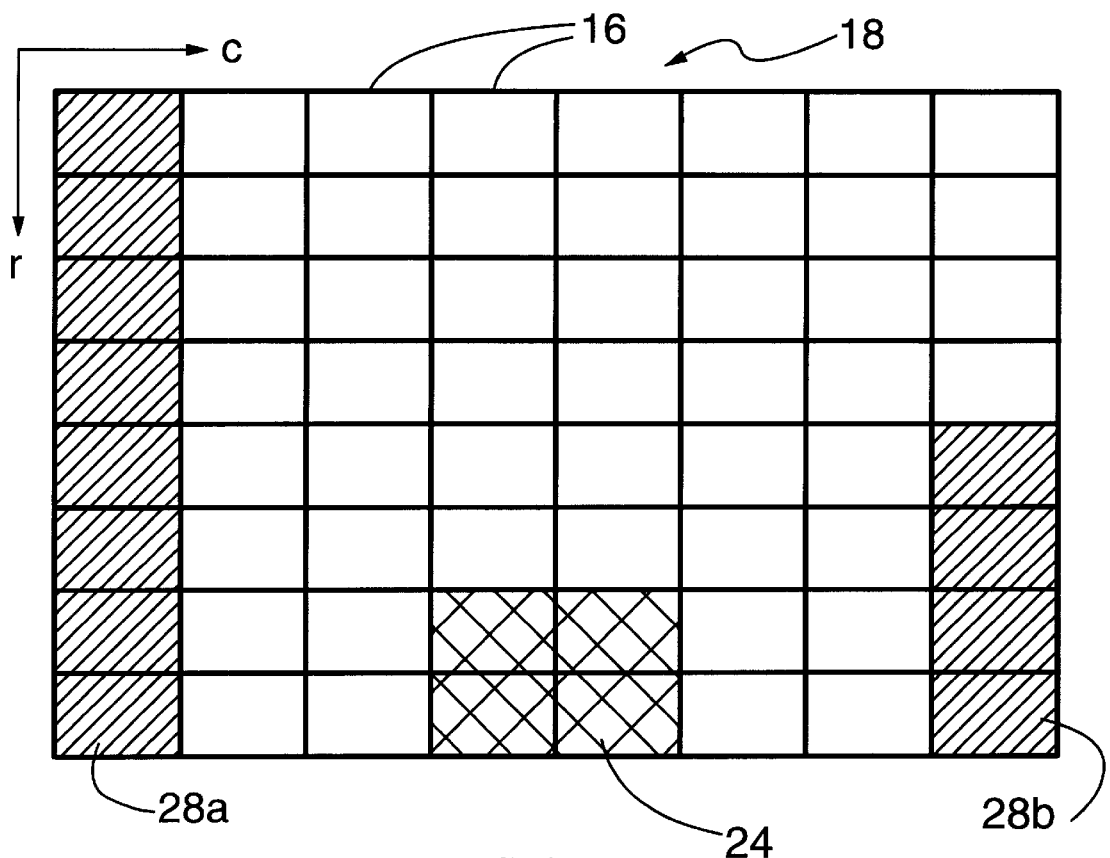
FIG. 2 shows a matrix of storage sectors of the page.

Page pixels 12 are divided into groups, or storage sectors 16. A matrix 18 of storage sectors, as shown in FIG. 2, is thereby defined within page 10. FIG. 2 illustrates storage sectors 16 but does not show the page pixels. Each of the storage sectors comprises n of the page pixels, where n is any desired number. In some embodiments, for example, n=1; in others, n=8. In the embodiment of FIGS. 1 and 2, n=6.

In FIG. 2, matrix 18 has R rows and C columns of storage sectors 16. Each storage sector is identified by a row number r and a column number c, where $0 \leq r \leq R-1$ and $0 \leq c \leq C-1$.

Figure 3A:
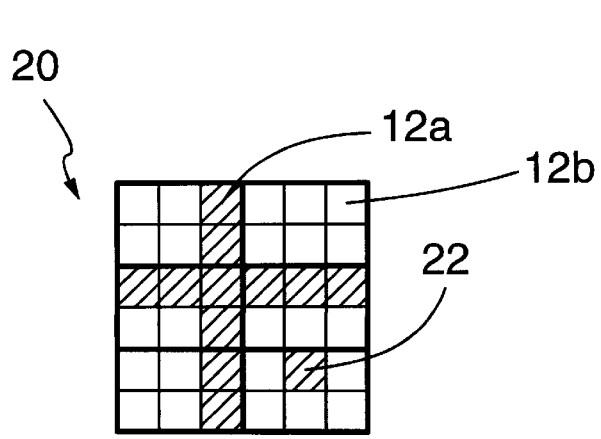
FIG. 3A shows a calibration mark.

Page 10 is formatted with M calibration marks 20, where M is any desired number. An example of one calibration mark 20 is shown in FIG. 3A. Each calibration mark 20 comprises one or more of the storage sectors. Calibration mark 20 is a pattern of "on" channel bits 12a and "off" channel bits 12b. Any pattern is possible; a preferred pattern is shown in FIG. 3A. Calibration marks 20 are stored throughout page 10 in, for example, a grid. Typically there are 32 page pixels 12 between adjacent calibration marks. In some embodiments, there are 64 page pixels 12 between adjacent calibration marks.

In the preferred embodiment, each calibration mark 20 comprises a point spread mark 22. Preferably, point spread mark 22 is an isolated "on" channel bit in a field of "off" channel bits. The use of the calibration marks and the point spread marks is described below in the discussion of data retrieval.

When the holographic storage medium is imperfect, page 10 typically comprises discarded storage sectors 24 as shown in FIG. 2. Discarded storage sectors 24 are not used because the holographic storage medium is defective, and errors often occur in reading discarded storage sectors 24. The locations of discarded sectors 24 are found by trial and error.

In the preferred embodiment, page 10 comprises alignment marks 28a and 28b, examples of which are shown in FIG. 2. The storage sectors belonging to alignment marks 28a and 28b, to calibration marks 20, and to discarded storage sectors 24 are "masked" storage sectors. The masked storage sectors are not used for data storage. The storage sectors that are not masked, i.e. the unmasked storage sectors, can be used to store data.

Figure 3B:
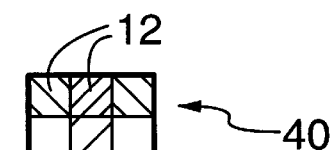
FIG. 3B illustrates a data pattern having page pixels corresponding to gray scale digits.

An unmasked storage sector that is used for data storage contains a data pattern 40, an example of which is shown in FIG. 3B. In FIG. 3B, each of the page pixels that compose data pattern 40 represents a gray scale digit. In FIG. 3B, data pattern 40 comprises page pixels 12 of varying transparency.

Figure 3C:
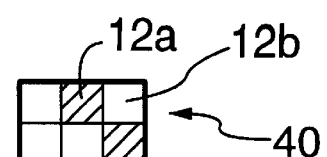
FIG. 3C illustrates a data pattern having page pixels corresponding to binary digits.

FIG. 3C shows another example of data pattern 40. In FIG. 3C, the data pattern is a binary data pattern comprising "on" channel bits 12a and "off" channel bits 12b.

Referring again to FIG. 2, alignment mark 28a is a stripe of "on" channel bits that runs roughly the length of page 20. Alignment mark 28b is another stripe of "on" channel bits that is shorter than alignment mark 28a. The alignment marks are used for coarse alignment during data readout, as discussed below. Other designs for the alignments marks are possible. The primary characteristic of the alignment marks is that each comprises a pattern of channel bits that has a small chance, for example less than 1%, of being generated coincidentally by the data patterns stored in the unmasked storage sectors. Another characteristic of the alignment marks is that alignment mark 28b is easily distinguishable from alignment mark 28a.

In the presently preferred embodiment, binary data is stored holographically. It is preferred that the binary data is first processed using known techniques. The binary data is divided into groups of bits, then additional error correction code bits are added. A typical error correction code is the Reed-Solomon code. The result of the error correction encoding is a stream of code words, each code word comprising data bits and error correction code bits.

Figure 4A:
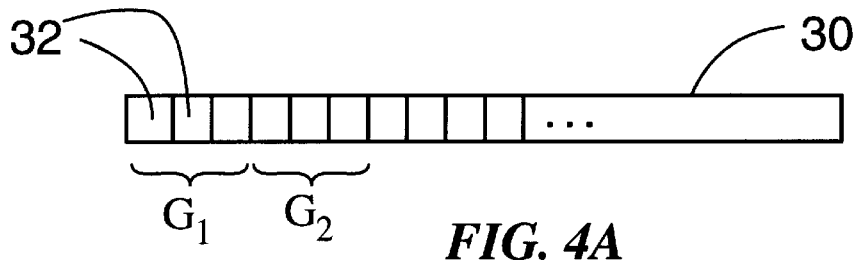
FIG. 4A shows a bit stream.

A bit stream 30 comprising binary bits 32, shown in FIG. 4A, is stored holographically. In the preferred embodiment, bit stream 30 comprises error correction code words, as outlined above. In general, however, bit stream 30 comprises any desired stream of binary data.

Bit stream 30 is preferably divided into a series of N data groups $G_1, G_2, \ldots G_N$. Each of the data groups comprises b binary bits. In FIG. 4A, for example, b=3. In general, however, b is any desired number.

Figure 4B:
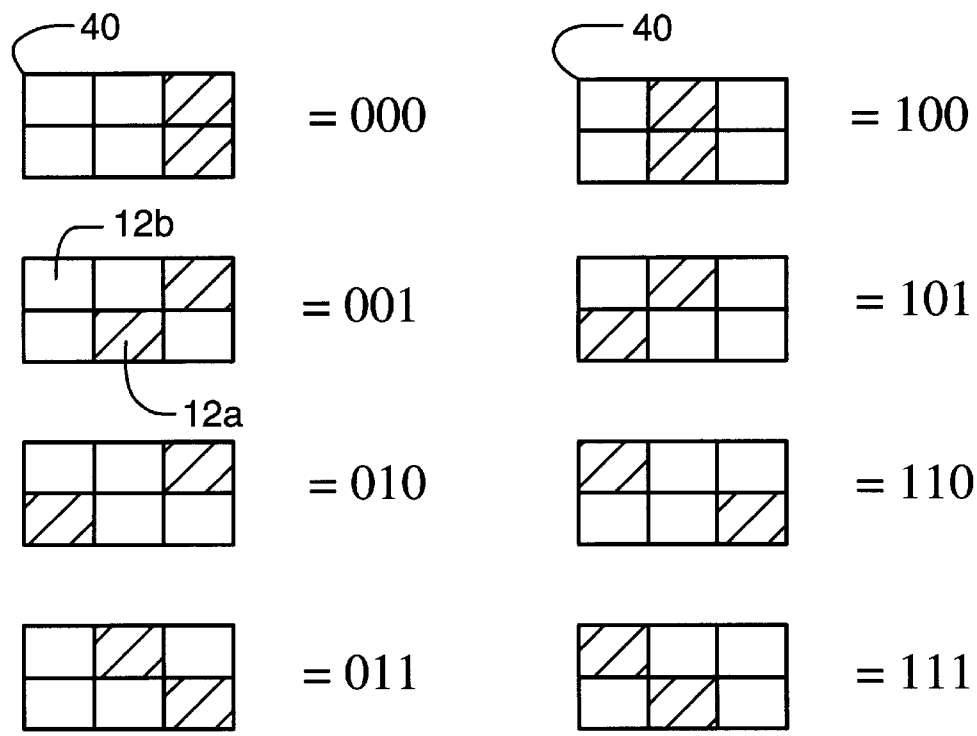
FIG. 4B shows a lookup table for converting between binary bits and data patterns.

Once bit stream 30 is divided into the data groups, the data groups are converted into data patterns 40, as illustrated in FIG. 4B. Preferably, data patterns 40 are arrangements of "on" channel bits 12a and "off" channel bits 12b. In some embodiments, the data groups are converted into the data patterns 40 using a lookup table 46, as illustrated in FIG. 4B. Lookup table 46 comprises a list of possible data groups and a list of data patterns 40; lookup table 46 serves as a dictionary to translate the data groups into data patterns 40. In the example of FIG. 4B, lookup table 46 correlates three-bit data groups to data patterns 40 having two "on" channel bits 12a and four "off" channel bits 12b.

Figure 4C:
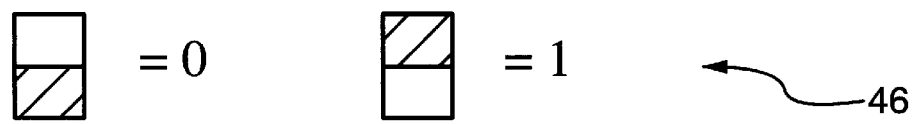
FIG. 4C shows the lookup table according to an alternative embodiment.

The association of the data groups to the data patterns is arbitrary, and FIG. 4B shows only one possibility. The total number of "on" channel bits and "off" channel bits in each data pattern is equal to the number of page pixels per storage sector, n. FIG. 4B gives an example where n=6. FIG. 4C gives another example of a conversion of bits 32 to data patterns 40. In FIG. 4C, the number of bits 32 in each of the data groups, b, is equal to 1, and the total number of "on" channel bits and "off" channel bits in each data pattern, n, is equal to 2.

In the preferred embodiment, each of the data patterns has m "on" channel bits and n–m "off" channel bits. An example is shown in FIG. 4B, where n=6 and m=2. Another example is given by FIG. 4C, where n=2 and m=1. There are n-choose-m different ways to arrange m "on" channel bits in a pattern of n total bits. Therefore n and m must satisfy the condition n-choose-m $\geq 2^b$. This condition ensures that each data pattern contains at least as much information as its associated data group.

In other embodiments, the data groups are converted into data patterns comprising gray scale information, as illustrated by FIG. 3B.

Once the data groups are converted into the data patterns, the data patterns are formatted onto page 10. Each data pattern is stored in one of the storage sectors 16. The data patterns are represented by the page pixels that compose the storage sectors. Once page 10 is formatted, a given storage sector may contain a data pattern corresponding to a data group; the storage sector may contain a pattern belonging to one of the alignment marks; the storage sector may contain a pattern belonging to one of the calibration marks; the storage sector may be one of the discarded storage sectors; the storage sector may be used for another function, or may simply be unused.

Data groups $G_1, G_2, \ldots, G_N$ are converted to data patterns 40; the resulting sequence of data patterns 40 is labeled $P_1, P_2, \ldots, P_N$, where $P_i$ is the data pattern corresponding to data group $G_i$. The data patterns are formatted into the unmasked storage sectors of page 10.

The sequence $P_1 \ldots P_N$ is not stored in consecutive unmasked storage sectors, because if for example a portion of the holographic storage medium deteriorates during or after data storage, some of the stored data may be damaged. If the data patterns are stored sequentially, the faulty portions of the holographic storage medium are likely to affect several data groups belonging to the same error correction code word, causing an irrecoverable error. However, if the data patterns of each error correction code word are dispersed throughout the page, errors are distributed among the code words, making it likely that the errors can be rectified using the error-correction code.

Interleaving Algorithm

Figure 5:
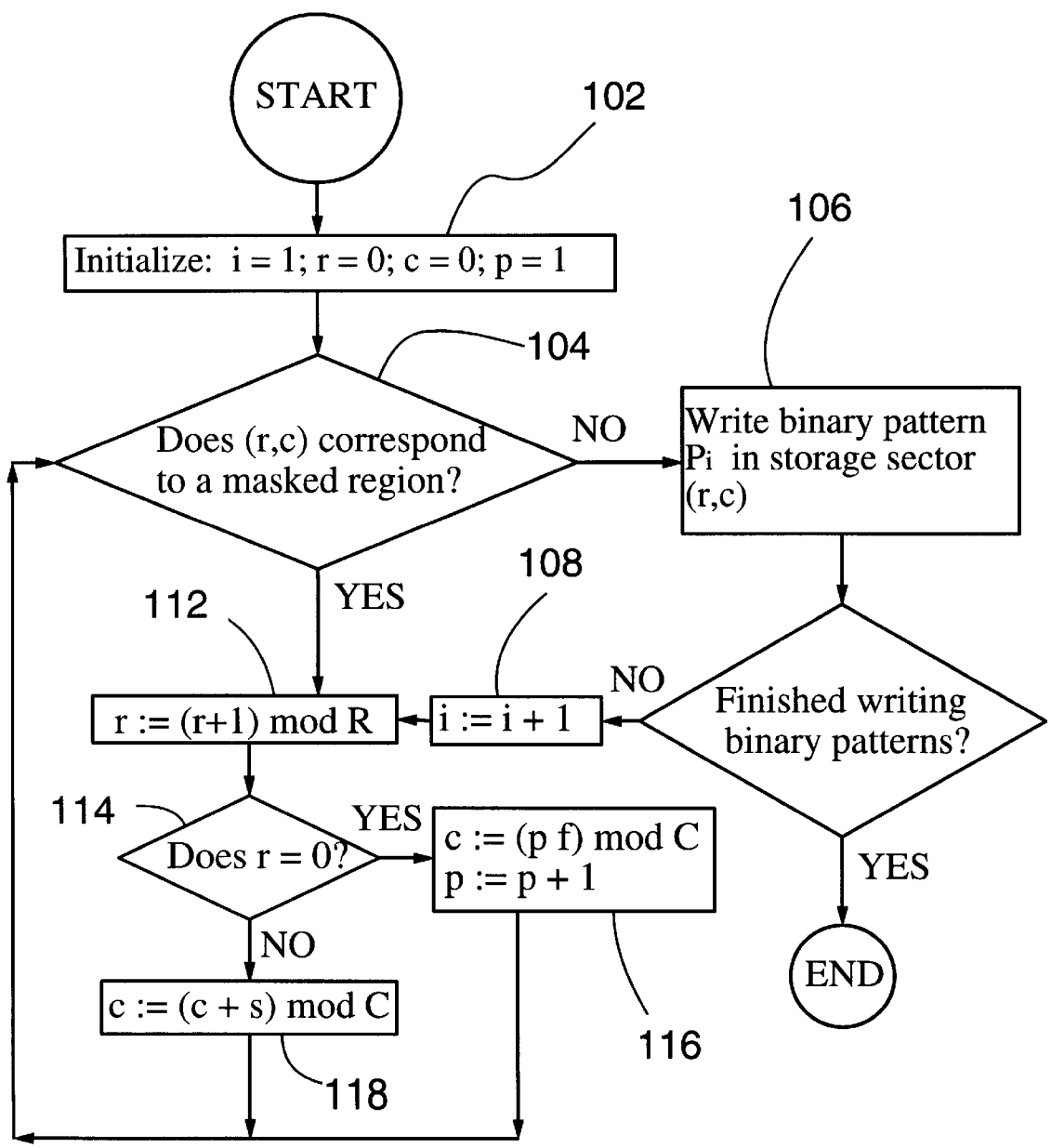
FIG. 5 is a flowchart of an algorithm used to interleave the data patterns.

The data patterns are distributed throughout the page by an interleaving algorithm shown in FIG. 5. Two numbers, an offset s and a page offset f, define the interleaving algorithm for dispersing the data patterns among the storage sectors. The number s gives the offset distance between sequential data patterns: in general, consecutive data patterns in the sequence $P_1 \ldots P_N$ are stored in adjacent rows, s columns apart.

An index i refers to the $i^{th}$ data pattern $P_i$. In an initialization step 102 of FIG. 5, index i is set equal to 1. Row number r and column number c of matrix 18 are set equal to 0, and an index p is set equal to 1. A first iteration of the interleaving algorithm begins with a step 104. In step 104, it is determined whether the storage sector having coordinates (r,c) is a masked storage sector. If storage sector (r,c) is masked, the interleaving algorithm skips directly to a step 112. If storage sector (r,c) is not masked, data pattern $P_i$ is stored in storage sector (r,c) in a step 106, then index i is incremented by 1 in a step 108. The algorithm then proceeds to step 112.

In the first iteration, row number r is incremented by 1 in step 112 and column number c is incremented by s in a step 118. The interleaving algorithm then returns to step 104 to begin additional iterations.

If in step 118 column number c meets or exceeds the number of columns C of matrix 18, so that c refers to a location to the right of matrix 18 in FIG. 2, c wraps around to the left side of matrix 18. That is, step 118 performs the operation c:=(c+s) mod C. This equation means that after s is added to c, the result is divided by C, and only the remainder is retained. The symbol ":=" is read "is set equal to" or "becomes," and is commonly known to computer programmers.

The rows are written in wrap-around fashion just as the columns are. Step 112 of FIG. 5 is written r:=(r+1) mod R. Step 112 is followed by a step 114 that determines whether r=0. If r=0, a step 116 sets column number c to p·f mod C, and index p is incremented by 1. From step 116, the interleaving algorithm proceeds directly to step 104, as shown in FIG. 5.

In another embodiment, step 112 is r:=(r+Δr) mod R, where Δr is any desired integer. An optimum value of Δr may be computed as follows. When bit stream 30 comprises error correction code words of length w, Δr is preferably equal to the number of rows of matrix 18 divided by the length of the code words:

$$\Delta r = R/w.$$

Both offset s and page offset f are relatively prime to the number of columns C. That is, neither s nor f has any factors in common with C. Step 116 then ensures that data patterns stored in the matrix of storage sectors are not overwritten when r wraps around. Furthermore, the fact that s is relatively prime to C ensures that the data patterns are dispersed to a maximal extent throughout the matrix of storage sectors.

The interleaving algorithm stores adjacent data patterns $P_i$ and $P_{i+1}$ in storage sector $(r_i, c_i)$ and $(r_{i+1}, c_{i+1})$, respectively. If $r_{i+1} - r_i > 0$, so that r has not wrapped around, then $c_{i+1} = (c_i + m_i s) \bmod C$, where $m_i$ is an integer equal to one plus the number of times a masked storage sector was encountered by step 104 between the writing of data patterns $P_i$ and $P_{i+1}$. Since the masked storage sectors are relatively sparse in the preferred embodiment, $m_i$ is typically equal to 1.

When all of the data patterns have been written, or the page is full, the interleaving algorithm is terminated. Page 10 of FIG. 1 then contains the alignment marks, the calibration marks, and the data patterns.

Storing the Page

Page 10 is then stored holographically. The page is displayed on spatial light modulator 66, as shown in FIG. 6. A monochromatic light source 50, such as a laser, generates a beam that is spit into a signal beam 60 and a reference beam 62. Signal beam 60 passes through spatial light modulator 66 and subsequently passes through standard optical components 63, such as a lens. Signal beam 60 then strikes holographic storage medium 70. Reference beam 62 is also incident upon holographic storage medium 70. An interference pattern between signal beam 60 and reference beam 62 is stored in holographic storage medium 70 according to known principles. In regions of constructive interference, the index of refraction of holographic storage medium 70 is changed. Page 10 is thereby stored as a hologram. Using the above technique, a number of pages are stored in the same holographic storage medium 70 by known multiplexing methods.

II. DATA RETRIEVAL

Figure 7:
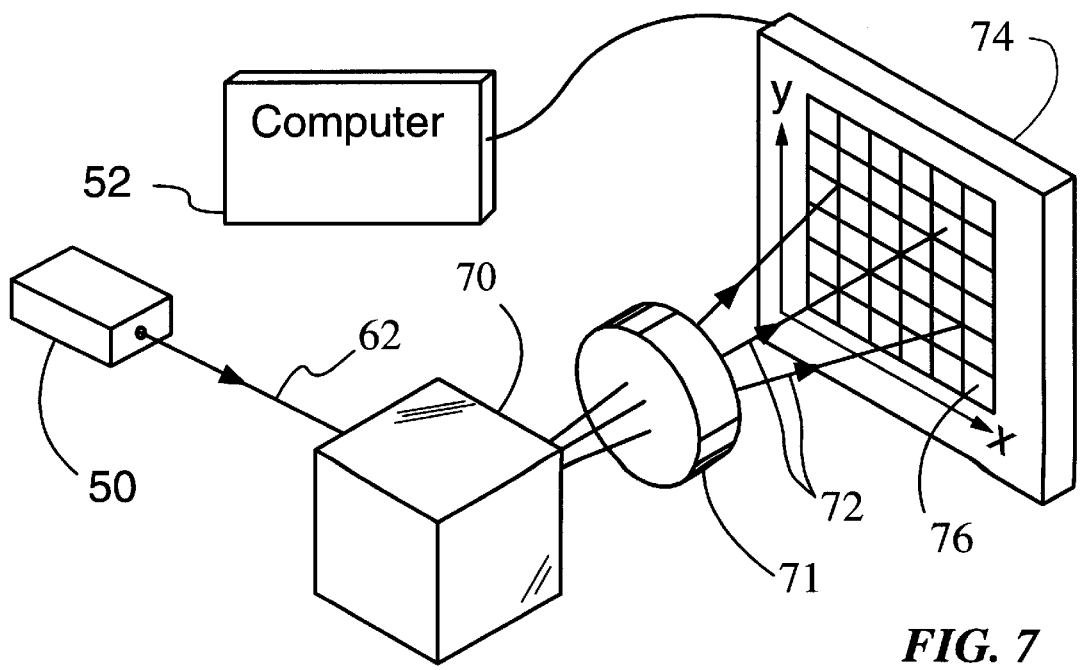
FIG. 7 illustrates a system for retrieving holographically stored information.
Figure 8:
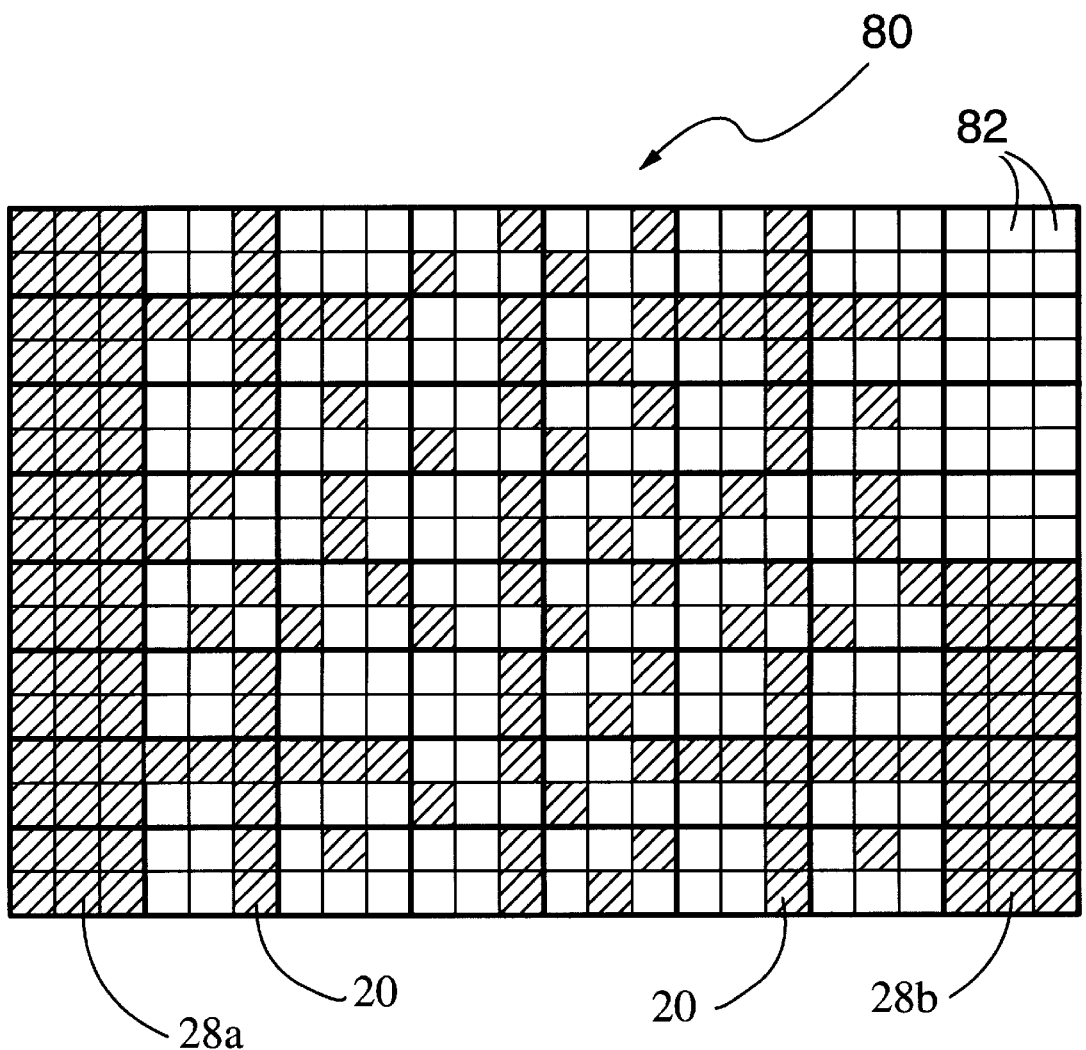
FIG. 8 shows an information pattern projected onto a detector by the system of FIG. 7.

A system for holographic readout of page-based data is shown in FIG. 7. Reference beam 62, generated by light source 50, is incident upon holographic storage medium 70 and causes an image beam 72 to be emitted. Image beam 72 is incident upon detector 74. An information pattern 80, as shown in FIG. 8, is thereby projected onto detector 74. Returning to FIG. 7, standard optical components 71, such as a lens, deliver image beam 72 to detector 74. Detector 74 has detector pixels 76, and is preferably a CCD detector. Cartesian coordinates x and y locate detector pixels 76 on detector 74.

Each detector pixel delivers an electrical output signal proportional to the intensity of light received. The output signals are sent to a computer 52. Computer 52 comprises any data processor, such as a personal computer, that is capable of gathering and processing the output signals from detector 74. Computer 52 runs a program or programs that perform the calculations outlined below.

Information pattern 80 has data pixels 82 corresponding to page pixels 12 of page 10. In some embodiments, each detector pixel is one fourth the size of the data pixels. In other embodiments, the detector pixels are the same size as the data pixels. In general, data pixels 82 are not perfectly coincident with detector pixels 76. Several factors contribute to this mismatch. First, image beam 72 may simply be misaligned. Second, optical components 63 and 71 distort the signal beam and the image beam, respectively, so that information pattern 80 is a deformed image of page 10. Third, optical components 63 and 71 unevenly focus different parts of the signal beam and image beam, respectively, causing data pixels 82 to be blurred. Each of these problems is addressed below.

Alignment: the Alignment Marks

A first step in reading information pattern 80 is identifying alignment marks 28a and 28b. The alignment marks are large compared to the size of the individual data pixels and can be easily located using the signals from detector pixels 76. One method for locating the alignment marks is to observe the average signal from each column of detector pixels 82. Most columns will correspond to a very low average intensity, except for those belonging to the alignment marks. If holographic storage medium 70 has been rotated by 90° before readout, the alignment marks will be horizontal, and can be found by averaging over rows of detector pixels.

Alignment marks 28a and 28b give a rough position of information pattern 80. The alignment marks are also used to determine an orientation of information pattern 80. During readout, the orientation of holographic storage medium 70 may have been changed relative to the orientation used during data storage. Information pattern 80 of FIG. 8 may then be rotated by ±90° or 180°, the information pattern may be backwards, or the information pattern may be rotated and backwards. All of these possibilities can be detected and compensated for, since alignment mark 28a is easily distinguished from alignment mark 28b.

Distortion: the Calibration Marks

A second step in reading information pattern 80 is locating calibration marks 20. Detector pixels 76 are labeled by coordinates such as Cartesian coordinates or polor coordinates. In the embodiment of FIG. 7, the detector pixels are identified by Cartesian coordinates x and y. A function g(x,y) describes an ideal light intensity pattern corresponding to one of the calibration marks 20. A function g(x-a,y-b) describes an ideal calibration mark whose bottom left corner, or origin, is located at detector pixel position (a,b).

A function f(x,y) is the actual detected light intensity pattern of information pattern 80 as detected by detector pixels 76. The value of f(x,y) is the value of the output signal of the detector pixel located at position (x,y). To find the first calibration mark, a correlation coefficient $h_1$ is evaluated for a number of values of a and b:

$$h_1(a, b) = \sum_{x,y} \frac{(f(x, y) - \overline{f})(g(x - a, y - b) - \overline{g})}{\overline{f}\overline{g}} \quad (1)$$

In Eq. (1), the sum extends over a set of detector pixels the size of one calibration mark; the bottom left corner of the detector pixels summed over is located at (a,b). The value of $\overline{f}$ is the average value of f(x,y) over the region of the summation of Eq. (1); $\overline{g}$ is the average value of g. The values of a and b that maximize correlation coefficient $h_1$ give the location of the origin of the first location mark. These optimal values of a and b are called $x_1$ and $y_1$, respectively.

The other calibration marks are found in a similar way. Using locations of the alignment marks, an approximate location of each calibration mark is determined. Then, for the $j^{th}$ calibration mark, a correlation coefficient $h_j$ is calculated as in Eq. (1) for a number of values of a and b in a neighborhood of the approximate location of the $j^{th}$ calibration mark. The values of a and b that maximize $h_j$ are called $x_j$ and $y_j$, and give the location of the origin of the $j^{th}$ calibration mark. The process is carried out for j=1 to M.

After the locations $(x_1,y_1) \ldots (x_M,y_M)$ of the calibration marks are found, these locations are used as references to find locations of any desired data pixels within the information pattern. The data pixels are located in the following way. The calibration marks have origins $(u_1,v_1) \ldots (u_M,v_M)$ within page 10, and origins $(x_1,y_1) \ldots (x_M,y_M)$ on detector 74. Two functions x(u,v) and y(u,v) describe the location of the data pixel corresponding to page pixel (u,v). The two functions are expressed in terms of adjustable parameters $A_k$ and $B_k$, and the functions are fitted to the points $(u_1,v_1) \ldots (u_M,v_M)$ and $(x_1,y_1) \ldots (x_M,y_M)$ by adjusting the parameters $A_k$ and $B_k$. Once the best fit values of the parameters $A_k$ and $B_k$ are obtained, the functions x(u,v) and y(u,v) define a mapping between coordinates (u,v) and coordinates (x,y) that is used to determine the location on detector 74 of the data pixel corresponding to the page pixel (u,v).

The functions x(u,v) and y(u,v) can be any parameterized functions, but are preferably polynomial functions. In the preferred embodiment, the functions are cubic functions:

$$x(u, v) = \sum_{r=0}^{3} \sum_{s=0}^{3-r} A_{rs} u^r v^s \quad (2)$$

$$y(u, v) = \sum_{r=0}^{3} \sum_{s=0}^{3-r} B_{rs} u^r v^s \quad (3)$$

The coefficients $A_{rs}$ and $B_{rs}$ are the adjustable parameters of the functions x(u,v) and y(u,v). The cubic functions of Eqs. (2) and (3) mathematically account for distortion caused by the optical components 63 and 71. Such distortion includes, for example, pincushion distortion.

To determine the coefficients $A_{rs}$ and $B_{rs}$, a weighted least squares fit is used. The $j^{th}$ calibration mark has an origin $(u_j,v_j)$ in page 10; Eqs. (2) and (3) predict the $j^{th}$ calibration mark to have an origin $(x_j^*, y_j^*)$, where $$x_j^* = \sum_{r=0}^{3} \sum_{s=0}^{3-r} A_{rs} u_j^r v_j^s$$

$$y_j^* = \sum_{r=0}^{3} \sum_{s=0}^{3-r} B_{rs} u_j^r v_j^s$$

On the other hand, the $j^{th}$ calibration was actually detected at location $(x_j,y_j)$. Using the well known weighted least squares technique, the difference between the predicted and observed values can be minimized by minimizing a quantity $\chi$ given by:

$$\chi = \sum_{j=1}^{M} h_j \{(x_j - x_j^*)^2 + (y_j - y_j^*)^2\}$$

The values of $A_{rs}$ and $B_{rs}$ that minimize $\chi$ are obtained and used for subsequent operations.

Once the coefficients $A_{rs}$ and $B_{rs}$ have been obtained from the above least squares method, they are used to identify detector pixels that receive specified portions of information pattern 80. The location of the data pixel that corresponds to a page pixel at position (u,v) is given by Eqs. (2) and (3).

The most natural coordinate system for the x-y coordinates of detector 74 is one where x and y take on integer values, each ordered pair (x,y) identifying one detector pixel. However, when Eqs. (2) and (3) are used to predict a position (x,y) corresponding to a page pixel (u,v), generally the resultant x and y will not be integers. Therefore there is some ambiguity as to which detector pixel should be associated with the page pixel at (u,v).

This ambiguity can be resolved in at least three ways. In one embodiment, the detector pixel in closest proximity to the predicted location (x,y) is used. A detector pixel located at (X,Y) is associated with the page pixel (u,v), wherein X=[x(u,v)+0.5] and Y=[y(u,v)+0.5], where x(u,v) and y(u,v) refer to the values obtained from Eqs. (2) and (3), and the square brackets mean that the integer portion of the enclosed expression is taken. A signal F(u,v) is associated with page pixel (u,v), where F(u,v) is equal to the output signal of the detector pixel located at (X,Y): F(u,v)=f(X,Y).

In a second embodiment, bilinear interpolation is used between four of the detector pixels closest to the values x(u,v) and y(u,v) found from Eqs. (2) and (3). This embodiment uses the following definitions: X=[x(u,v)]; ΔX=x(u, v)−[x(u,v)]; Y=[y(u,v)]; ΔY=y(u,v)−[y(u,v)]. Here the brackets denote the integer portion, as before. The signal associated with page pixel (u,v) is:

$$F(u, v) = (1 - \Delta X)(1 - \Delta Y)f(X, Y) + (1 - \Delta X)\Delta Y f(X, Y+1) + \quad (4)$$
$$\Delta X (1 - \Delta Y) f(X+1, Y) + \Delta X \Delta Y f(X+1, Y+1)$$

This embodiment therefore interpolates between signals of four contiguous detector pixels (X,Y), (X,Y+1), (X+1,Y), and (X+1,Y+1). The interpolation results in a signal F(u,v) corresponding to page pixel (u,v).

A third embodiment uses a method that combines the previous two. In this embodiment, X, Y, ΔX, and ΔY are calculated as in the second embodiment above. If ΔX<0.25 and ΔY<0.25, F(u,v) is defined as f(X,Y). Otherwise, Eq.(4) is used to define F(u,v).

In alternative embodiments, any number of detector pixels in a neighborhood of x(u,v) and y(u,v) are used to determine F(u,v). In alternative embodiments, other forms of interpolation, rather than the bilinear form of Eq. (4), are used.

The process of finding F(u,v) is repeated for all the desired locations (u,v) of page 10. The resulting values of F(u,v) are stored in an electronic memory as a first data array {F(u,v)}. The values of F(u,v) correspond to a received light intensity of information pattern 80 generated by holographic recovery of page 10.

Blurring: the Point Spread Marks

In the preferred embodiment, the data array elements that correspond to point spread marks 22 of page 10 are identified within the first data array {F(u,v)}. Ideally, the $j^{th}$ point spread mark produces a signal $s_j(u,v)$. However, because of blurring introduced by optical components 63 and 71, the ideal signal $s_j(u,v)$ is not detected. This blurring includes spherical aberration, coma, astigmatism, and field curvature of the optical components.

In a vicinity of the first point spread mark, the signal F(u,v) is equal to:

$$F(u,v) = B_1(u,v) * s_1(u,v) \quad (5)$$

Here $B_1(u,v)$ is a point spread function that mathematically describes the blurring, and the star symbol indicates a convolution.

The ideal signal $s_1(u,v)$ is known, since the profile of the original point spread marks of page 10 are known. F(u,v) is also known. Therefore Eq. (5) can be solved for point spread function $B_1(u,v)$ using well known Fourier transform techniques. Also using Fourier transform techniques, an inverse point spread function $B_1^{-1}(u,v)$ may be obtained, where $B_1^{-1}$ satisfies $$B_1^{-1}(u,v) * B_1(u,v) = \delta_{u,o} \delta_{v,o}$$

Here the Kronecker delta function is used: $\delta_{u,o} = 1$ when u=0; $\delta_{u,o} = 0$ when u≠0. Similarly, inverse point spread functions $B_2^{-1}$ . . . $B_M^{-1}$ may be obtained from the second through the $M^{th}$ point spread marks, respectively.

Figure 9:
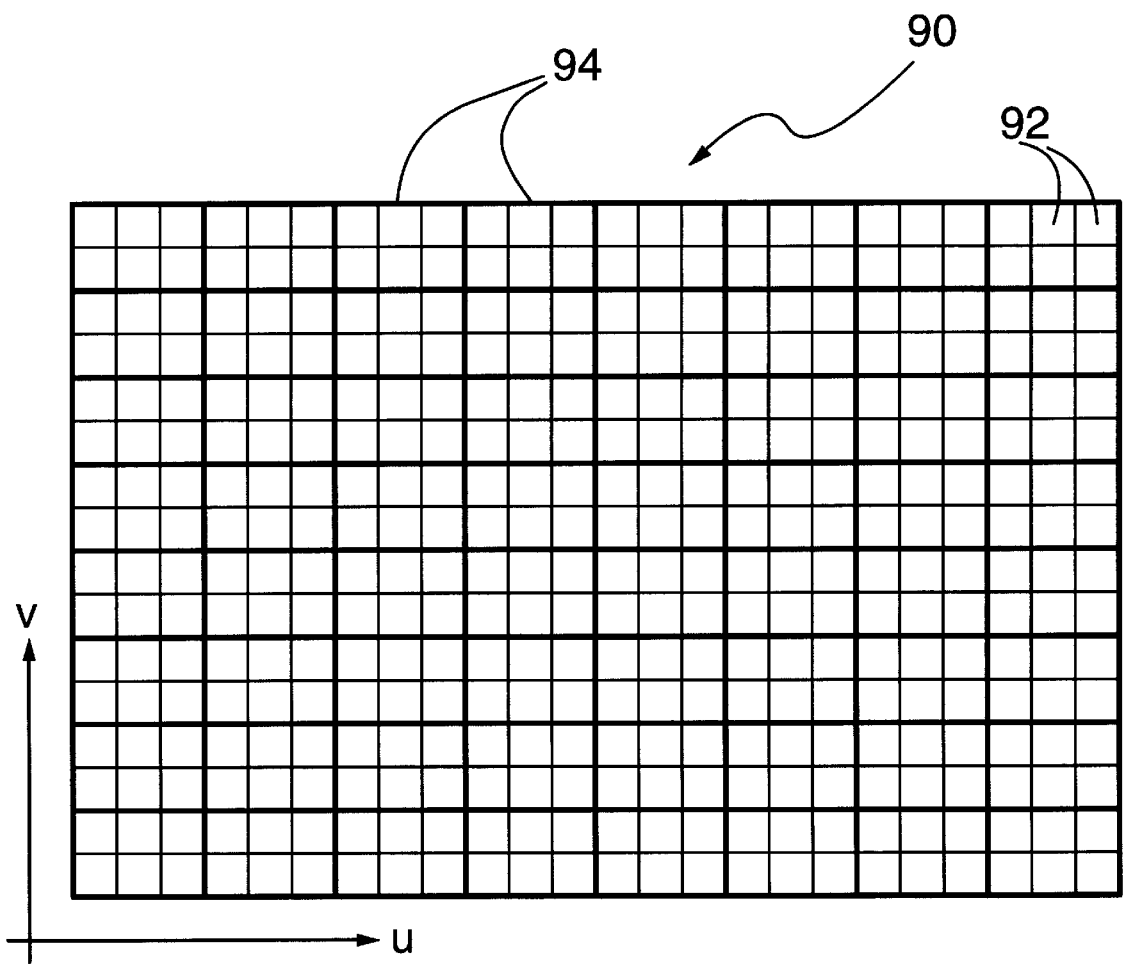
FIG. 9 is a schematic of a data array of signals derived from the information pattern.

Because the amount of blurring is generally inhomogenous over the information pattern, typically $B_i \neq B_j$ when i≠j. A master inverse point spread function $B_{u',v'}^{-1}(u,v)$ is constructed from the M functions $B_j^{-1}(u,v)$ using interpolation. $B_{u',v'}^{-1}(u,v)$ characterizes the blurring in the vicinity of (u',v'). To correct for blurring caused by the optical components, the signal F(u,v) is convolved with the master inverse point spread function $B_{u',v'}^{-1}(u,v)$ to obtain a sharpened signal F'(u,v). The values of F'(u,v) compose a second data array 90 of FIG. 9 that corresponds to a digitally sharpened image of information pattern 80. Data array 90 has array elements 92 labeled by coordinates u and v. The (u,v) element of data array 90 stores the value of F'(u,v).

In some embodiments, the inverse point spread function is not used. In these embodiments, F'(u,v)=F(u,v). In all embodiments, data array F'(u,v) is derived from light intensities of information pattern 80 as detected by detector pixels 76.

The above description has separated two steps, using the calibration marks to correct for distortion and using the inverse point spread functions to correct for blurring, and described the steps sequentially. However, in some embodiments the order of the two steps is inverted, and in some embodiments, the steps are performed simultaneously.

When the blurring is a more serious problem than the distortion, the point spread functions are determined first and used to digitally sharpen information pattern 80. Then the calibration marks are used to correct for distortion. When the blurring and the distortion are equally serious, the compensation for both are carried out simultaneously using the above techniques. This data processing, carried out on computer 52, results in array F'(u,v), as before.

Further Data Processing

The values F'(u,v) of the array elements of data 90 typically take on gray scale values. The gray scale values F(u,v) are converted into the digits corresponding to page pixels 12 of page 10. In the embodiments where page pixels 12 correspond to gray scale digits, the values of array elements 92 are converted into gray scale digits.

In the embodiments where page pixels 12 correspond to binary digits, the values of array elements 92 are converted into channel bits. In one such embodiment, a simple thresholding is used, so that, for example, any value of F'(u,v) below half a maximum value of F'(u,v) is converted to a binary 0; any value above the half maximum is associated with a binary 1.

In the preferred embodiment, each data pattern of page 10 has m "on" channel bits and n–m "off" channel bits. In this embodiment, data sectors 94 are identified within data array 90. Data sectors 94 correspond to storage sectors 16 of page 10. There are R rows and C columns of data sectors in data array 90. Data sectors 94 are identified by the row number r and column number c. A plurality of data sectors 94 correspond to data patterns 40. Each data sector has n array elements. To convert the gray coded array elements of one of the data sectors to a data pattern, the m largest values of n elements are identified as "on" channel bits; the remaining n–m values are identified as "off" channel bits.

Using the technique of identifying the m largest array element values of the $i^{th}$ data sector as binary 1's and the remaining n–m values as 0's, the gray coded array F(u,v) is converted to binary. Page 10 comprising data patterns 40 is thereby recovered from data array 90. Page 10 is stored in computer 52.

In another embodiment, a Viterbi algorithm is used to convert gray coded data F(u,v) to the data patterns 40 belonging to page 10. In the Viterbi algorithm, a number of test states comprising data patterns are formed from the values of F(u,v); a metric is established on the set of paths through the test states, and an optimum path of test states is found. The optimum path corresponds to the desired decoding of F(u,v) into data patterns. For more information on the Viterbi algorithm, see U.S. Pat. No. 5,740,184 by Heanue et al. Using this technique, page 10 may also be obtained.

Once page 10 is recovered, data patterns 40 are preferably de-interleaved by reversing the interleaving algorithm of FIG. 5. This results in the sequence of data patterns $P_1$ . . . $P_N$. Two data patterns $P_i$ and $P_{i+1}$ found in locations (r,c) and (r',c') of matrix 18, respectively, are defined to be consecutive when r'–r=m; and (c'–c) mod C=$m_i$ s, where $m_i$ is a positive integer correlated to the masked storage sectors of page 10. In this instance, $P_{i+1}$ follows $P_i$ in the sequence of data patterns.

$P_{i+1}$ may also immediately follow $P_i$ in the sequence when r'–r<0. In this case, row number r has wrapped around from the bottom of data array 90 to the top. $P_{i+1}$ will immediately follow $P_i$ in this case if c' is displaced from c by the appropriate number of page offsets f and offsets s, as obtained from the interleaving algorithm of FIG. 5 during the data storage.

The data patterns are subsequently converted into the binary groups $G_1$ . . . $G_N$ using, for example, lookup table 46 of FIG. 4B. Bit stream 30 is thereby recovered. The binary bits that belong to bit stream 30 are then error correction decoded if necessary.

The above description contains many specific examples which are intended for illustration and are not intended to limit the invention. It will be clear to one skilled in the art that the above embodiments may be altered in many ways without departing from the scope of the invention. Accordingly, the scope of the invention should be determined by the following claims and their legal equivalents.

We claim:

1. A method of reading binary data stored in a holographic storage medium, said method comprising the following steps:
    a) illuminating said holographic storage medium with a reference beam to project an information pattern onto a detector, wherein said information pattern comprises calibration marks and data pixels, said detector comprises detector pixels, and each of said detector pixels delivers an output signal;
    b) using said output signals to identify reference locations of said calibration marks;
    c) fitting a mathematical function to said reference locations;
    d) using said function to determine a first data location of a first of said data pixels; and
    e) determining a value of a first digit stored by said first data pixel, using the output signal of a first of said detector pixels, wherein said first detector pixel is the detector pixel in closest proximity to said first data location.

2. The method of claim 1, further comprising the step of: identifying additional detector pixels in a vicinity of said first detector pixel;
    and wherein the step of determining said value of said first digit comprises the step of interpolating between the output signals of the first detector pixel and the additional detector pixels.

3. The method of claim 2 wherein said step of interpolating comprises the step of using bilinear interpolation.

4. The method of claim 1 wherein said function is a polynomial function.

5. The method of claim 4 wherein said polynomial function is cubic.

6. The method of claim 1, wherein said information pattern additionally comprises alignment marks, and wherein said method further comprises the step of using locations of said alignment marks to determine a position and an orientation of said information pattern.

7. The method of claim 1, wherein said calibration marks comprise a first point spread mark, and wherein the method further comprises the step of using the output signals of a number of said detector pixels in a vicinity of said first point spread location to determine a point spread function characterizing a blurring of said data pixels.

8. The method of claim 1, further comprising the step of using a Viterbi algorithm to convert said output signals into a plurality of digits.

9. The method of claim 1, further comprising the following steps:
    a) using said output signals to form a data array;
    b) identifying a data sector comprising n elements of said data array, wherein n>1;
    c) identifying the m largest values of said n elements as "on" channel bits and identifying the remaining n–m values of said n elements as "off" channel bits, thereby obtaining a data pattern corresponding to said sector; and
    d) converting said data pattern to a binary number.

10. The method of claim 1, further comprising the steps of:
    a) converting said output signals to a bit stream comprising binary bits, and
    b) error correction decoding said binary bits.

11. The method of claim 1, further comprising the following steps for de-interleaving data;
    a) using output signals from said detector to form a page comprising a matrix of R rows and C columns of storage sectors, wherein said storage sectors comprise masked storage sectors, and wherein a plurality of said storage sectors comprise data patterns; and
    b) defining data patterns $P_i$ and $P_{i+1}$ located in columns c and c', respectively, and in rows r and r', respectively, of said matrix to be adjacent when:
        (i) $r'-r=m_i$, and
        (ii) $(c'-c) \bmod C = m_i \, s$,
    wherein s is a number relatively prime to C, and wherein $m_i$ is a positive integer correlated to said masked storage sectors.

12. A method of storing a page of data in a holographic storage medium, said method comprising the following steps:
    a) converting said data into a sequence of data patterns $P_1 \ldots P_N$;
    b) defining a matrix of storage sectors within said page, wherein said matrix comprises R rows and C columns of said storage sectors;
    c) defining a number s, wherein s is relatively prime to C;
    d) storing said data patterns in said matrix of storage sectors, wherein adjacent data patterns $P_i$ and $P_{i+1}$ are stored in columns $c_i$ and $c_{i+1}$, respectively, and in rows $r_i$ and $r_{i+1}$, respectively, of said matrix; and
    e) storing said page in said holographic storage medium; wherein $c_{i+1} = (c_i + m_i \, s) \bmod C$ when $r_{i+1} - r_i > 0$, wherein each $m_i$ is an integer.

13. The method of claim 12, wherein said storage sectors comprise masked storage sectors that are not used to store said data patterns, and wherein said integers $m_i$ are correlated to said masked storage sectors.

14. The method of claim 12, further comprising the step of storing calibration marks in said matrix.

15. The method of claim 12, further comprising the step of storing alignment marks in said matrix.

16. The method of claim 12, wherein said step of converting said data into said sequence comprises the step of error correction encoding said data.

17. The method of claim 12, wherein each of said data patterns comprises m "on" channel bits and n–m "off" channel bits.

18. A system for reading a page of data, wherein said page comprises page pixels, and wherein said system comprises:
    a) a holographic storage medium;
    b) a monochromatic light source for illuminating said holographic storage medium with a reference beam, thereby causing an image beam to emerge from said holographic storage medium;
    c) a detector for detecting an information pattern carried by said image beam, wherein said information pattern comprises calibration marks and data pixels; and
    d) a computer in electrical communication with said detector;
    wherein said computer runs a program that
        (i) uses locations of said calibration marks to define a mapping between coordinates of said page and coordinates of said information pattern, and
        (ii) uses said mapping to determine a location on said detector of a data pixel corresponding to a first of said page pixels;

whereby a digit stored by said first page pixel is retrieved.

19. The system of claim 18 wherein said mapping comprises first and second polynomial functions.

20. The system of claim 19 wherein said first and second polynomial functions are cubic functions.

21. The system of claim 18, wherein said detector comprises detector pixels, and wherein said program uses output signals from a number said detector pixels proximate to said location of said data pixel to determine a signal corresponding to said first page pixel.

22. The system of claim 21 wherein said number is one.

23. The system of claim 21 wherein said number is four, and wherein said program interpolates between said output signals.

24. The system of claim 18, wherein said information pattern additionally comprises first and second alignment marks, wherein a length of said first alignment mark is less than a length of said second alignment mark, and wherein said program uses locations of said alignment marks to determine a position and an orientation of said information pattern.

25. The system of claim 18, wherein said calibration marks comprise a first point spread mark, and wherein said program
   a) uses output signals from said detector to determine a point spread function from said first point spread mark, wherein said point spread function characterizes a blurring of said data pixels; and
   b) uses an inverse of said point spread function and said output signals to obtain a data array corresponding to a digitally sharpened image of said information pattern.

26. The system of claim 18, wherein said program
   a) uses output signals from said detector to form a data array;
   b) identifies a data sector comprising n elements of said data array, wherein n>1;
   c) identifies the m largest values of said n elements as "on" channel bits and identifying the remaining n–m values of said n elements as "off" channel bits, thereby obtaining a data pattern corresponding to said sector; and
   d) converts said data pattern to a binary number.

27. The system of claim 18, wherein said program:
   a) uses output signals from said detector to recover said page, wherein said page comprises a matrix of R rows and C columns of storage sectors, wherein said storage sectors comprise masked storage sectors, and wherein a plurality of said storage sectors comprise data patterns; and
   b) defines data patterns $P_i$ and $P_{i+1}$, located in columns c and c', respectively, and in rows r and r', respectively, of said matrix to be adjacent when:
      (i) $r'-r=m_i$, and
      (ii) $(c'-c) \mod C = m_i \, s$,
   wherein s is a number relatively prime to C, and wherein $m_i$ is a positive integer correlated to said masked storage sectors.

* * * * *